(12) United States Patent
Kawasumi

(10) Patent No.: US 9,613,342 B2
(45) Date of Patent: Apr. 4, 2017

(54) INFORMATION PROCESSING APPARATUS, INFORMATION PROCESSING SYSTEM, AND INFORMATION PROCESSING METHOD

(71) Applicant: Kenji Kawasumi, Kanagawa (JP)

(72) Inventor: Kenji Kawasumi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 139 days.

(21) Appl. No.: 14/700,498

(22) Filed: Apr. 30, 2015

(65) Prior Publication Data

US 2015/0331736 A1 Nov. 19, 2015

(30) Foreign Application Priority Data

May 13, 2014 (JP) .................................. 2014-099998

(51) Int. Cl.
  *G06F 11/07* (2006.01)
  *G06Q 10/00* (2012.01)
  *H04N 1/00* (2006.01)

(52) U.S. Cl.
  CPC .......... *G06Q 10/20* (2013.01); *G06F 11/079* (2013.01); *G06F 11/0709* (2013.01); *G06F 11/0751* (2013.01); *H04N 1/00* (2013.01)

(58) Field of Classification Search
  CPC . G06F 11/0751; G06F 11/079; G06F 11/2257

USPC ...................................................... 714/26, 37
See application file for complete search history.

(56) References Cited

U.S. PATENT DOCUMENTS

| | | | |
|---|---|---|---|
| 2005/0157565 A1* | 7/2005 | Lee | G11C 29/26 365/189.05 |
| 2006/0156126 A1* | 7/2006 | Oshima | G01R 31/31932 714/731 |
| 2012/0167162 A1* | 6/2012 | Raleigh | G06F 21/57 726/1 |

FOREIGN PATENT DOCUMENTS

| | | | |
|---|---|---|---|
| JP | 2011-100283 | | 5/2011 |
| JP | 2012053830 A | * | 3/2012 |

\* cited by examiner

*Primary Examiner* — Chae Ko
(74) *Attorney, Agent, or Firm* — Cooper & Dunham LLP

(57) ABSTRACT

An information processing apparatus includes an acquiring unit configured to acquire first failure information on failures that have occurred in a first device of a predetermined model of a predetermined customer, and acquire second failure information on failures that have occurred in a second device of the predetermined model; a calculating unit configured to calculate first operation information on the first device by using the first failure information, and calculate second operation information on the second device by using the second failure information; and an output unit configured to output proposal information indicating a proposal based on the first operation information and the second operation information.

16 Claims, 11 Drawing Sheets

| GUID | CustomerID | Name |
|---|---|---|
| 00001 | CUSTOMER001 | COMPANY A |
| 00002 | CUSTOMER002 | COMPANY B |
| 00003 | CUSTOMER003 | COMPANY C |

| GUID | GROUP ID | CustomerID | PARENT GROUP ID | Name |
|---|---|---|---|---|
| 00001 | GROUP1 | CUSTOMER001 | - | NORTH AMERICA |
| 00002 | GROUP2 | CUSTOMER001 | GROUP1 | UNITED STATES OF AMERICA |
| 00003 | GROUP3 | CUSTOMER001 | GROUP2 | CITY C |

FIG.7

| GUID | SERIAL NUMBER | MAC ADDRESS | IP ADDRESS | HOST NAME | VENDOR NAME | MODEL NAME | FIRM-WARE VERSION | INSTALLA-TION DATE | LEASE EXPIRY DATE | INITIAL INSTALLA-TION COST | GROUP ID |
|---|---|---|---|---|---|---|---|---|---|---|---|
| 00001 | FA2233-000 | 00-00-AA-BB-CC-DD | 10.212.21.85 | MFP1 | COM-PANY R | MPC 3500 | 1.5.1.0003 | 2011/12/10 | 2017/12/09 | ¥100000 | GROUP3 |
| 00002 | BC2233-111 | 00-00-11-22-33-44 | 10.212.21.86 | MFP2 | COM-PANY R | MPC 2500 | 1.5.1.0003 | 2011/12/10 | 2017/12/09 | ¥50000 | GROUP3 |
| 00003 | FA2233-001 | 00-00-AA-BB-CC-EE | 10.212.21.87 | MFP3 | COM-PANY R | MPC 3500 | 1.5.1.0003 | 2011/12/10 | 2017/12/09 | ¥100000 | GROUP3 |
| 00004 | FA2233-002 | 00-00-AA-BB-CC-FF | 10.212.21.88 | MFP4 | COM-PANY R | MPC 3500 | 1.5.1.0003 | 2011/12/10 | 2017/12/09 | ¥100000 | GROUP3 |

FIG.9

| GUID | TICKET ID | OCCURRENCE DATE | RECOVERY DATE | CLOSE TIME | FAILURE CATEGORY | FAILURE SUMMARY | SERVICE SUMMARY | MODEL NAME | SERIAL NUMBER |
|---|---|---|---|---|---|---|---|---|---|
| 00001 | TICKET1 | 2012/04/05 09:00:00 | 2012/04/05 13:00:00 | 4.00 | PAPER JAM | PAPER JAM | PAPER REMOVED | MPC 3500 | FA2233-000 |
| 00002 | TICKET2 | 2012/04/07 09:00:00 | 2012/04/07 14:00:00 | 5.00 | NO TONER | NO TONER | TONER REPLACED | MPC 3500 | FA2233-000 |
| 00003 | TICKET3 | 2012/04/09 19:00:00 | 2012/04/10 12:00:00 | 17.00 | NETWORK ERROR | NETWORK ERROR | RETURNED TO DEFAULT SETTING | MPC 3500 | FA2233-000 |
| 00004 | TICKET4 | 2012/04/12 09:00:00 | 2012/04/12 13:00:00 | 4.00 | PAPER JAM | PAPER JAM | PAPER REMOVED | MPC 3500 | FA2233-001 |
| 00005 | TICKET5 | 2012/04/13 09:00:00 | 2012/04/13 11:00:00 | 2.00 | PAPER JAM | PAPER JAM | PAPER REMOVED | MPC 3500 | FA2233-002 |
| 00006 | TICKET6 | 2012/04/14 09:00:00 | 2012/04/14 16:00:00 | 7.00 | NO TONER | NO TONER | TONER REPLACED | MPC 3500 | FA2233-002 |
| 00007 | TICKET7 | 2012/04/15 09:00:00 | 2012/04/15 11:00:00 | 2.00 | UNKNOWN | UNKNOWN | REBOOTED | MPC 3500 | FA2233-010 |
| 00008 | TICKET8 | 2012/04/16 09:00:00 | 2012/04/16 13:00:00 | 4.00 | PAPER JAM | PAPER JAM | PAPER REMOVED | MPC 3500 | FA2233-011 |
| 00009 | TICKET9 | 2012/04/17 09:00:00 | 2012/04/17 14:00:00 | 5.00 | PAPER JAM | PAPER JAM | PAPER REMOVED | MPC 3500 | FA2233-011 |
| 00010 | TICKET10 | 2012/04/20 09:00:00 | 2012/04/20 19:00:00 | 10.00 | NO TONER | NO TONER | TONER REPLACED | MPC 3500 | FA2233-011 |
| 00011 | TICKET11 | 2012/04/21 09:00:00 | 2012/04/21 22:00:00 | 13.00 | NETWORK ERROR | NETWORK ERROR | RETURNED TO DEFAULT SETTING | MPC 3500 | FA2233-012 |

INFORMATION PROCESSING APPARATUS, INFORMATION PROCESSING SYSTEM, AND INFORMATION PROCESSING METHOD

CROSS-REFERENCE TO RELATED APPLICATION

The present application claims priority to and incorporates by reference the entire contents of Japanese Patent Application No. 2014-099998 filed in Japan on May 13, 2014.

BACKGROUND OF THE INVENTION

1. Field of the Invention

The present invention relates to an information processing apparatus, an information processing system, and an information processing method.

2. Description of the Related Art

Conventionally, in the field of managed print services (MPS), there is a known technology to manage an operation state of a device, such as an operation rate, the number of failures, or contents of failures of a device in a customer environment, and provide the operation state of the device as a service report to a customer (for example, see Japanese Laid-open Patent Publication No. 2011-100283).

However, in the conventional technology as described above, a service report is used only for the purpose of confirming compliance and non-compliance with an agreement made with a customer, and pieces of device information accumulated every day through management of an operation state of a device is not utilized for a service of MPS, such as for improvement of the operation state of the device.

Therefore, there is a need for an information processing apparatus, an information processing system, and an information processing method capable of utilizing accumulated pieces of device information for a service.

SUMMARY OF THE INVENTION

It is an object of the present invention to at least partially solve the problems in the conventional technology.

According to an embodiment, there is provided an information processing apparatus that includes: a failure information acquiring unit configured to acquire one or more pieces of first failure information as pieces of failure information on failures that have occurred in one or more first devices that are devices of a predetermined model of a predetermined customer from among a plurality of management target devices, and acquire one or more pieces of second failure information as pieces of failure information on failures that have occurred in one or more second devices that are devices of the predetermined model from among the management target devices; a calculating unit configured to calculate a piece of first operation information as a piece of operation information on the one or more first devices by using the one or more pieces of first failure information, and calculate a piece of second operation information as a piece of operation information on the one or more second devices by using the one or more pieces of second failure information; and an output unit configured to output a piece of proposal information indicating a proposal based on the piece of first operation information and the piece of second operation information.

According to another embodiment, there is provided an information processing system that includes: a failure information storage unit configured to store a plurality of pieces of failure information on failures that have occurred in a plurality of management target devices; a failure information acquiring unit configured to, from the failure information storage unit, acquire one or more pieces of first failure information as pieces of failure information on failures that have occurred in one or more first devices that are devices of a predetermined model of a predetermined customer from among the management target devices, and acquire one or more pieces of second failure information as pieces of failure information on failures that have occurred in one or more second devices that are devices of the predetermined model from among the management target devices; a calculating unit configured to calculate a piece of first operation information as a piece of operation information on the one or more first devices by using the one or more pieces of first failure information, and calculate a piece of second operation information as a piece of operation information on the one or more second devices by using the one or more pieces of second failure information; and an output unit configured to output a piece of proposal information indicating a proposal based on the piece of first operation information and the piece of second operation information.

According to still another embodiment, there is provided an information processing method that includes: acquiring one or more pieces of first failure information as pieces of failure information on failures that have occurred in one or more first devices that are devices of a predetermined model of a predetermined customer from among a plurality of management target devices; acquiring one or more pieces of second failure information as pieces of failure information on failures that have occurred in one or more second devices that are devices of the predetermined model from among the management target devices; calculating a piece of first operation information as a piece of operation information on the one or more first devices by using the one or more pieces of first failure information; calculating a piece of second operation information as a piece of operation information on the one or more second devices by using the one or more pieces of second failure information; and outputting a piece of proposal information indicating a proposal based on the piece of first operation information and the piece of second operation information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a diagram illustrating an example of pieces of device information of the embodiment;

FIG. 9 is a diagram illustrating an example of pieces of failure information of the embodiment;

DETAILED DESCRIPTION OF THE PREFERRED EMBODIMENTS

Exemplary embodiments of an information processing apparatus, an information processing system, an information processing method, and a program according to the present invention will be described in detail below with reference to the accompanying drawings.

Figure 1:
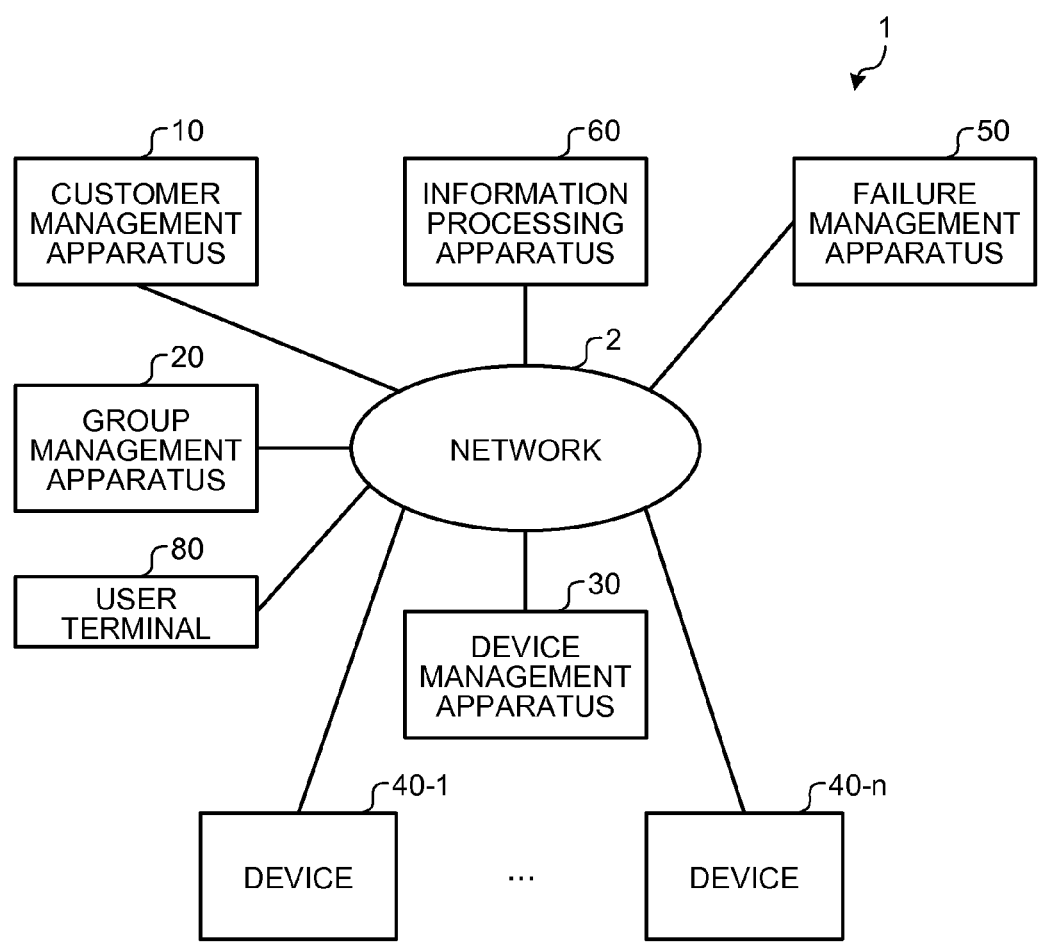
FIG. 1 is a block diagram illustrating an example of a configuration of an information processing system of an embodiment.

FIG. 1 is a block diagram illustrating an example of a configuration of an information processing system 1 of the embodiment. As illustrated in FIG. 1, the information processing system 1 includes a customer management apparatus 10, a group management apparatus 20, a device management apparatus 30, devices 40-1 to 40-n (n≥1), a failure management apparatus 50, an information processing apparatus 60, and a user terminal 80. The customer management apparatus 10, the group management apparatus 20, the device management apparatus 30, the devices 40-1 to 40-n, the failure management apparatus 50, the information processing apparatus 60, and the user terminal 80 are connected to one another via a network 2. The network 2 is realized by, for example, the Internet, a local area network (LAN), or the like.

Figures 2, 3:
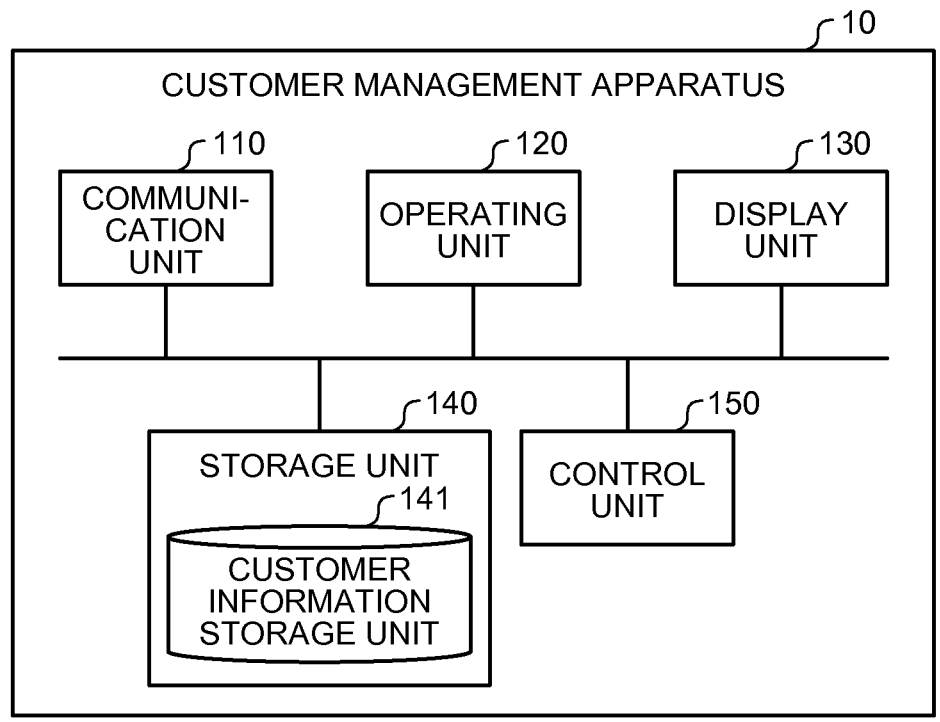
FIG. 2 is a block diagram illustrating an example of a configuration of a customer management apparatus of the embodiment.
FIG. 3 is a diagram illustrating an example of pieces of customer information of the embodiment.

FIG. 2 is a block diagram illustrating an example of a configuration of the customer management apparatus 10 of the embodiment. The customer management apparatus 10 manages pieces of customer information, and includes, as illustrated in FIG. 2, a communication unit 110, an operating unit 120, a display unit 130, a storage unit 140, and a control unit 150.

The communication unit 110 communicates with an external device, such as the information processing apparatus 60, via the network 2 and is realized by a communication device, such as a network interface card (NIC).

The operating unit 120 inputs various operations, and is realized by an input device, such as a keyboard, a mouse, a touch pad, or a touch panel.

The display unit 130 displays various screens, and is realized by a display device, such as a liquid crystal display or a touch panel display.

The storage unit 140 stores therein various programs executed by the customer management apparatus 10, data used in various processes performed by the customer management apparatus 10, and the like. The storage unit 140 is realized by, for example, at least any of a magnetically-recordable storage device, an optically-recordable storage device, and an electrically-recordable storage device, such as a hard disk drive (HDD), a solid state drive (SSD), a memory card, an optical disk, or a random access memory (RAM). The storage unit 140 includes a customer information storage unit 141.

The customer information storage unit 141 stores therein pieces of customer information that is information on a customer. FIG. 3 is a diagram illustrating an example of pieces of the customer information of the embodiment. In the example illustrated in FIG. 3, a piece of the customer information is information in which a globally unique identifier (GUID), a customer ID, and a name are associated with one another. The GUID is an identifier for identifying a record (a piece) of the customer information (a column of the customer information). The customer ID (an example of a piece of customer identification information) is an identifier for identifying a customer. The name is a name of the customer.

The control unit 150 controls each of the units of the customer management apparatus 10, and is realized by a control device, such as a central processing unit (CPU). The control unit 150 manages input and output of the customer information stored in the customer information storage unit 141.

For example, when an administrator or the like of the customer management apparatus 10 inputs a new piece of customer information or a piece of update information on an existing piece of customer information through the operating unit 120, the control unit 150 updates the piece of the customer information stored in the customer information storage unit 141. For another example, when the information processing apparatus 60 inputs a name through the communication unit 110, the control unit 150 acquires a record (a piece) of the customer information containing the name from the pieces of the customer information stored in the customer information storage unit 141, and returns the record to the information processing apparatus 60. Meanwhile, it is sufficient that at least a customer ID associated with the name is contained in the record of the customer information acquired by the control unit 150.

Figures 4, 5:
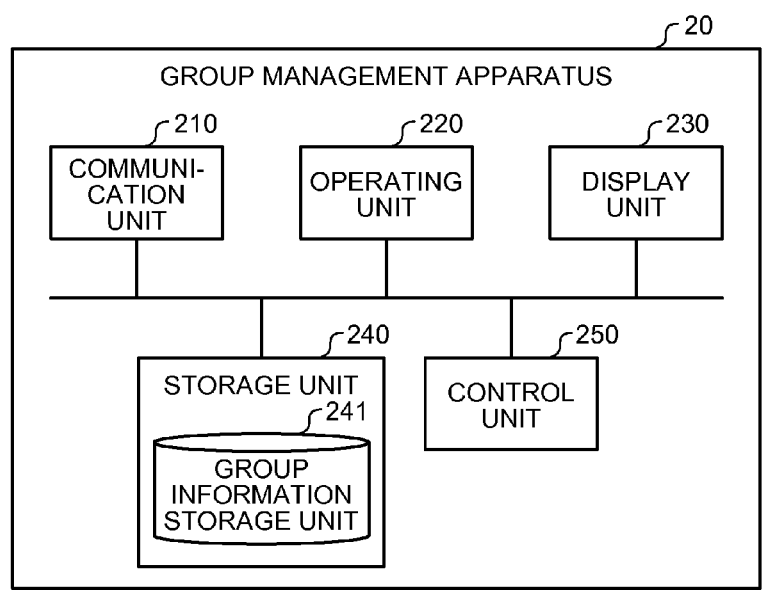
FIG. 4 is a block diagram illustrating an example of a configuration of a group management apparatus of the embodiment.
FIG. 5 is a diagram illustrating an example of pieces of group information of the embodiment.

FIG. 4 is a block diagram illustrating an example of a configuration of the group management apparatus 20 of the embodiment. The group management apparatus 20 manages group information, and includes, as illustrated in FIG. 4, a communication unit 210, an operating unit 220, a display unit 230, a storage unit 240, and a control unit 250.

The communication unit 210 communicates with an external apparatus, such as the information processing apparatus 60, via the network 2, and is realized by a NIC or the like.

The operating unit 220 inputs various operations, and is realized by an input device, such as a keyboard, a mouse, a touch pad, or a touch panel.

The display unit 230 displays various screens, and is realized by a display device, such as a liquid crystal display or a touch panel display.

The storage unit 240 stores therein various programs executed by the group management apparatus 20, data used in various processes performed by the group management apparatus 20, and the like. The storage unit 240 is realized by, for example, at least any of a magnetically-recordable storage device, an optically-recordable storage device, and an electrically-recordable storage device, such as an HDD, an SSD, a memory card, an optical disk, or a RAM. The storage unit 240 includes a group information storage unit 241.

The group information storage unit 241 stores therein pieces of group information that is information on customer groups. It is sufficient that the customer groups are groups, into which customers are divided, and correspond to a customer regional structure, such as a continent, a country/region, or a city, or correspond to a customer organizational structure, for example; however, it is not limited thereto. Further, groups may have a hierarchical structure.

FIG. 5 is a diagram illustrating an example of pieces of the group information of the embodiment. In the example illustrated in FIG. 5, a piece of the group information is information in which a GUID, a group ID, a customer ID, a parent group ID, and a name are associated with one another. The GUID is an identifier for identifying a record (a piece) of the group information (a column of the group information). The group ID (an example of a piece of group identification information) is an identifier for identifying a group. The customer ID is an identifier for identifying a customer. The parent group ID is an identifier for identifying a higher-level group. The name is a name of the group.

In the examples illustrated in FIG. 3 and FIG. 5, groups (a regional structure) of a company A with a customer ID of "CUSTOMER001" have a hierarchical structure, in which the United States of America with a group ID of "GROUP2" belongs to North America with a group ID of "GROUP1", and city C with a group ID of "GROUP3" belongs to the United States of America with the group ID of "GROUP2".

The control unit 250 controls each of the units of the group management apparatus 20, and is realized by a control device, such as a CPU. The control unit 250 manages input and output of the group information stored in the group information storage unit 241.

For example, when an administrator or the like of the group management apparatus 20 inputs a new piece of group information or a piece of update information on an existing piece of group information through the operating unit 220, the control unit 250 updates the piece of the group information stored in the group information storage unit 241. For another example, when the information processing apparatus 60 inputs a customer ID through the communication unit 210, the control unit 250 acquires a record (a piece) of the group information containing the customer ID from the pieces of the group information stored in the group information storage unit 241, and returns the record to the information processing apparatus 60. Meanwhile, it is sufficient that at least a group ID associated with the customer ID is contained in the record of the group information acquired by the control unit 250.

Figure 6:
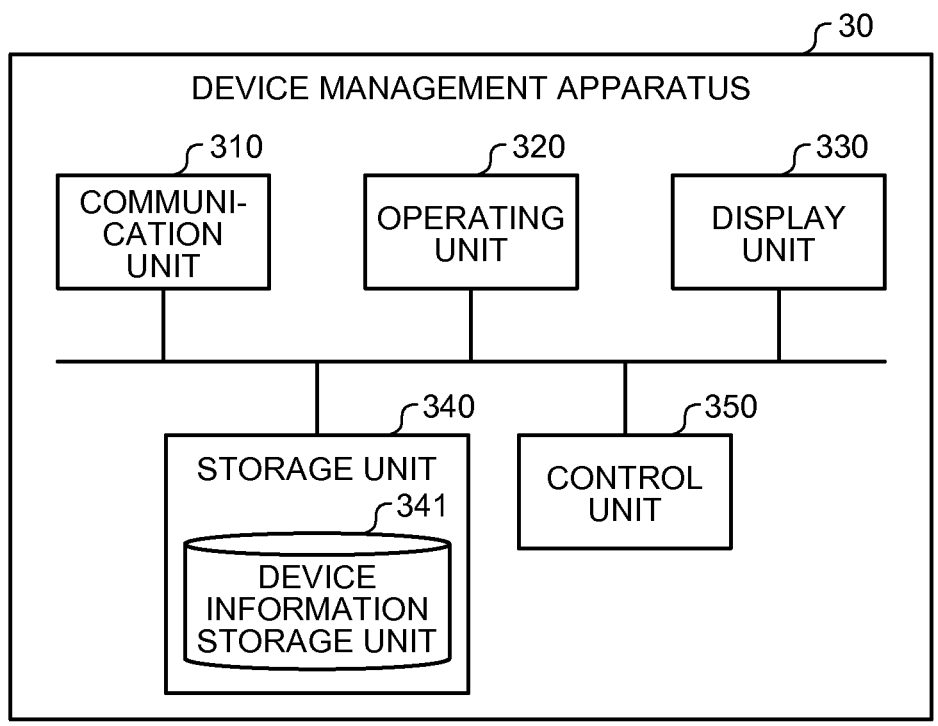
FIG. 6 is a block diagram illustrating an example of a configuration of a device management apparatus of the embodiment.

FIG. 6 is a block diagram illustrating an example of a configuration of the device management apparatus 30 of the embodiment. The device management apparatus 30 manages pieces of device information on the devices 40-1 to 40-n (examples of a plurality of management target devices), and includes, as illustrated in FIG. 6, a communication unit 310, an operating unit 320, a display unit 330, a storage unit 340, and a control unit 350.

The devices 40-1 to 40-n may be any devices that are connectable to the network 2. For example, the devices 40-1 to 40-n may be image forming apparatuses, such as printers, copiers, multifunction peripherals (MFPs), scanners, or facsimile machines, may be various electronic devices, such as projectors, cameras, air conditioners, refrigerators, fluorescent lights, automatic vending machines, or handheld terminals, may be personal computers (PC), or may be tablets. An MFP has at least two of a copying function, a printing function, a scanner function, and a facsimile function. In the embodiment, it is assumed that the devices 40-1 to 40-n are image forming apparatuses; however, it is not limited thereto.

The communication unit 310 communicates with external apparatuses, such as the devices 40-1 to 40-n and the information processing apparatus 60, via the network 2, and is realized by a NIC or the like.

The operating unit 320 inputs various operations, and is realized by an input device, such as a keyboard, a mouse, a touch pad, or a touch panel.

The display unit 330 displays various screens, and is realized by a display device, such as a liquid crystal display or a touch panel display.

The storage unit 340 stores therein various programs executed by the device management apparatus 30, data used in various processes performed by the device management apparatus 30, and the like. The storage unit 340 is realized by, for example, at least any of a magnetically-recordable storage device, an optically-recordable storage device, and an electrically-recordable storage device, such as an HDD, an SSD, a memory card, an optical disk, or a RAM. The storage unit 340 includes a device information storage unit 341.

The device information storage unit 341 stores therein pieces of device information on the devices 40-1 to 40-n. Incidentally, the device information may be any information as long as the information relates to device management. FIG. 7 is a diagram illustrating an example of pieces of the device information of the embodiment. In the example illustrated in FIG. 7, a piece of the device information is information in which a GUID, a serial number, a MAC address, an IP address, a host name, a vendor name, a model name, a firmware version, an installation date, a lease expiry date, an initial installation cost, and a group ID are associated with one another.

The GUID is an identifier for identifying a record (a piece) of the device information (a column of the device information). The serial number (an example of a piece of device identification information) is an identifier for identifying a device. A device identified by the serial number is owned by a group identified by the group ID (in particular, a customer with a customer ID associated with the group ID in the pieces of the group information illustrated in the FIG. 5). The MAC address is a MAC address of the device. The IP address is an IP address of the device. The host name is a host name of the device. The vendor name is a vendor name of the device. The model name (an example of model identification information) is a model name indicating a model of the device. The firmware version is a version of firmware installed in the device. The installation date is a date on which the device is installed (introduced) in a customer environment. The lease expiry date is an expiry date of lease of the device to the customer. The initial installation cost is an initial cost needed to install the device in the customer environment. The group ID is an identifier for identifying a group.

The control unit 350 controls each of the units of the device management apparatus 30, and is realized by a control device, such as a CPU. The control unit 350 manages input and output of the device information stored in the device information storage unit 341.

For example, the control unit 350 acquires pieces of the device information from the devices 40-1 to 40-n through the communication unit 310, stores the pieces of the device information in the device information storage unit 341 if the acquired pieces of the device information are information on new devices, or updates the pieces of the device information stored in the device information storage unit 341 if the acquired pieces of the device information are information on existing devices. Specifically, the control unit 350 acquires the pieces of the device information by communicating with the devices 40-1 to 40-n by using a general-purpose protocol, such as a Simple Network Management Protocol (SNMP), commonly used for device management. Incidentally, as a method of acquiring the pieces of the device information, the control unit 350 may voluntarily acquire the pieces of the device information from the devices 40-1 to 40-n, or the devices 40-1 to 40-n may voluntarily notify the device management apparatus 30 (the control unit 350) of the pieces of the device information.

Further, for example, when the information processing apparatus 60 inputs a group ID through the communication unit 310, the control unit 350 acquires a record (a piece) of the device information containing the group ID from the device information stored in the device information storage unit 341, and returns the record to the information processing apparatus 60. Meanwhile, it is sufficient that at least a serial number and a model name associated with the group ID are contained in the record of the device information acquired by the control unit 350.

Figure 8:
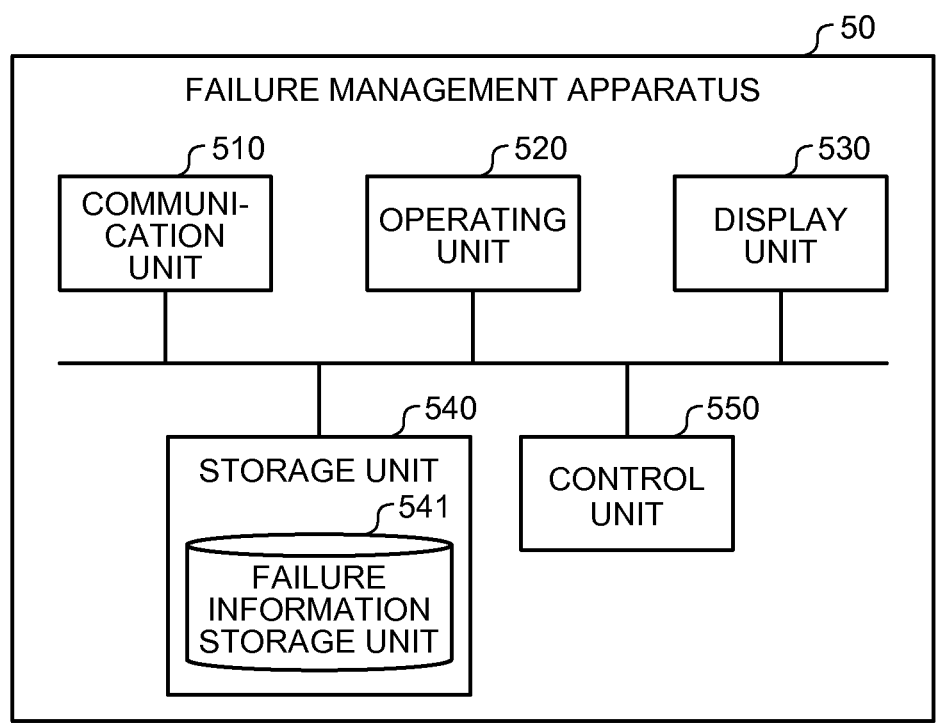
FIG. 8 is a block diagram illustrating an example of a configuration of a failure management apparatus of the embodiment.

FIG. 8 is a block diagram illustrating an example of a configuration of the failure management apparatus 50 of the embodiment. The failure management apparatus 50 manages pieces of failure information (tickets) on failures that have occurred in the devices 40-1 to 40-n, and includes, as illustrated in FIG. 8, a communication unit 510, an operating unit 520, a display unit 530, a storage unit 540, and a control unit 550.

The communication unit 510 communicates with an external apparatus, such as the information processing apparatus 60, via the network 2, and is realized by a NIC or the like.

The operating unit 520 inputs various operations, and is realized by an input device, such as a keyboard, a mouse, a touch pad, or a touch panel.

The display unit 530 displays various screens, and is realized by a display device, such as a liquid crystal display or a touch panel display.

The storage unit 540 stores therein various programs executed by the failure management apparatus 50, data used in various processes performed by the failure management apparatus 50, and the like. The storage unit 540 is realized by, for example, at least any of a magnetically-recordable storage device, an optically-recordable storage device, and an electrically-recordable storage device, such as an HDD, an SSD, a memory card, an optical disk, or a RAM. The storage unit 540 includes a failure information storage unit 541.

The failure information storage unit 541 stores therein pieces of failure information on failures that have occurred in the devices 40-1 to 40-n. FIG. 9 is a diagram illustrating an example of pieces of the failure information of the embodiment. In the example illustrated in FIG. 9, a piece of the failure information is information in which a GUID, a ticket ID, an occurrence date, a recovery date, a close time, a failure category, a failure summary, a service summary, a model name, and a serial number are associated with one another.

The GUID is an identifier for identifying a record (a piece) of the failure information (a column of the failure information). The ticket ID is an identifier for identifying a failure that has occurred. The occurrence date is a date of occurrence of the failure. The recovery date is a date of recovery from the failure. The close time (an example of a piece of downtime information) is a downtime due to the failure that has occurred, that is, a time from when the failure occurred to when the failure was resolved, and is obtained by subtracting the occurrence date from the recovery date. A device in which the failure has occurred is deemed to have stopped operation during the close time. The failure category (an example of a piece of failure type identification information) is used for identifying a type of the failure that has occurred, and may be, for example, a category of a content of the failure. The failure summary is a summary of the content of the failure. The service summary is a summary of a content of troubleshooting of the failure. The model name is a model name of the device in which the failure has occurred. The serial number is an identifier for identifying the device in which the failure has occurred.

The control unit 550 controls each of the units of the failure management apparatus 50, and is realized by a control device, such as a CPU. The control unit 550 manages input and output of the pieces of the failure information stored in the failure information storage unit 541.

For example, when an administrator or the like of the failure management apparatus 50 inputs a new piece of failure information through the operating unit 520 and a ticket is issued, or when the administrator or the like inputs a piece of update information on an existing piece of the failure information through the operating unit 520 and a ticket is closed, the control unit 550 updates the piece of the failure information stored in the failure information storage unit 541. For another example, when the information processing apparatus 60 inputs a serial number or a model name through the communication unit 510, the control unit 550 acquires a record (a piece) of the failure information containing the serial number or the model name from the pieces of the failure information stored in the failure information storage unit 541, and returns the record to the information processing apparatus 60. Meanwhile, it is sufficient that at least a close time associated with the serial number or the model name is contained in the record of the failure information acquired by the control unit 550. However, it is preferable that the record further contains a failure category.

Figure 10:
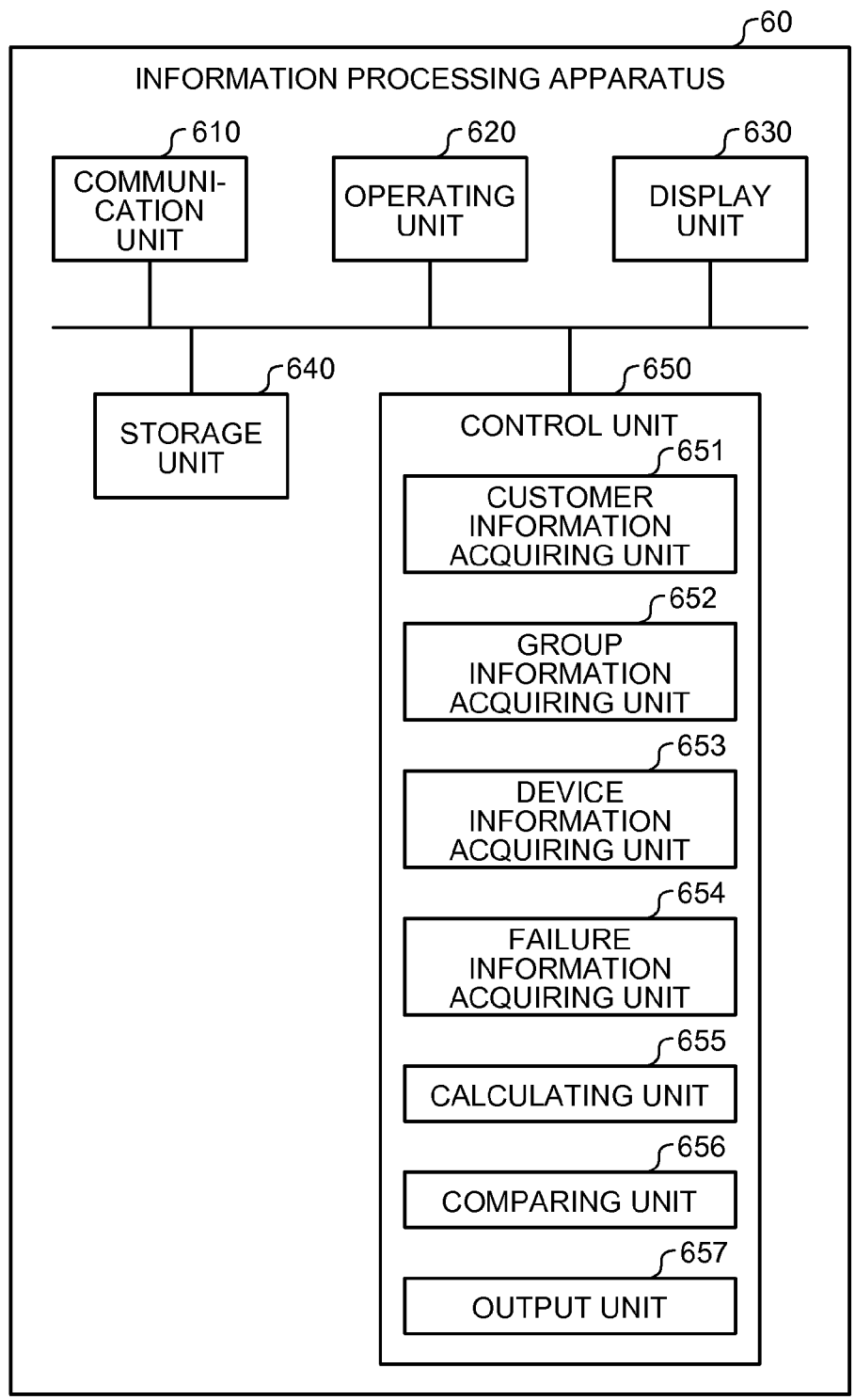
FIG. 10 is a block diagram illustrating an example of a configuration of an information processing apparatus of the embodiment.

FIG. 10 is a block diagram illustrating an example of a configuration of the information processing apparatus 60 of the embodiment. The information processing apparatus 60 acquires pieces of the customer information from the customer management apparatus 10, pieces of the group information from the group management apparatus 20, pieces of the device information from the device management apparatus 30, and pieces of the failure information from the failure management apparatus 50, and outputs pieces of proposal information indicating a proposal for one or more first devices, which are devices of a predetermined model of a predetermined customer. The information processing apparatus 60 includes, as illustrated in FIG. 10, a communication unit 610, an operating unit 620, a display unit 630, a storage unit 640, and a control unit 650.

Figure 11:
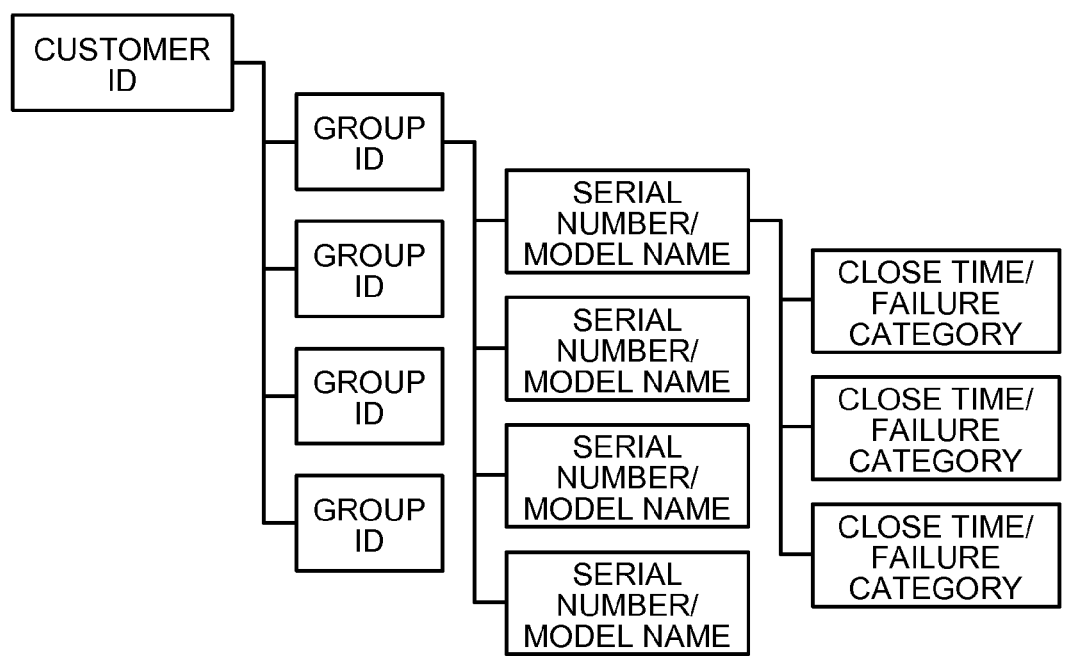
FIG. 11 is a diagram illustrating an example of a hierarchical structure of a piece of the customer information, pieces of the group information, pieces of the device information, and pieces of the failure information of the embodiment.

FIG. 11 is a diagram illustrating an example of a hierarchical structure of a piece of the customer information, pieces of the group information, pieces of the device information, and pieces of the failure information of the embodiment. A customer ID is illustrated as an example of the piece of the customer information, group IDs are illustrated as examples of the pieces of the group information, serial numbers/model names are illustrated as examples of the pieces of the device information, and close times/failure categories are illustrated as examples of the failure information. As illustrated in FIG. 11, information used for a proposal for the one or more first devices has a hierarchical structure, in which the group IDs belongs to the customer ID, the serial numbers/model names belong to any of the group IDs, and the close times/failure categories belong to any of the serial numbers/model names.

In the embodiment, an example will be described, in which a predetermined customer is the company A (see FIG. 3), a predetermined model is a model with a model name of "MPC 3500" (see FIG. 7), that is, the first devices are devices that are installed in an environment of the company A (or may be an environment of a group of the company A) and that have the model name of "MPC 3500"; however, it is not limited thereto.

The communication unit 610 communicates with external apparatuses, such as the customer management apparatus 10, the group management apparatus 20, the device management apparatus 30, the failure management apparatus 50, and the user terminal 80, via the network 2, and is realized by a NIC or the like.

The operating unit 620 inputs various operations, and is realized by an input device, such as a keyboard, a mouse, a touch pad, or a touch panel.

The display unit 630 displays various screens, and is realized by a display device, such as a liquid crystal display or a touch panel display.

The storage unit 640 stores therein various programs executed by the information processing apparatus 60, data used in various processes performed by the information processing apparatus 60, and the like. The storage unit 640 is realized by, for example, at least any of a magnetically-recordable storage device, an optically-recordable storage device, and an electrically-recordable storage device, such as an HDD, an SSD, a memory card, an optical disk, or a RAM.

The control unit 650 controls each of the units of the information processing apparatus 60, and is realized by a control device, such as a CPU. The control unit 650 includes a customer information acquiring unit 651, a group information acquiring unit 652, a device information acquiring unit 653, a failure information acquiring unit 654, a calculating unit 655, a comparing unit 656, and an output unit 657. The control unit 650 activates (executes) a program stored in the storage unit 640, so that the customer information acquiring unit 651, the group information acquiring unit 652, the device information acquiring unit 653, the failure information acquiring unit 654, the calculating unit 655, the comparing unit 656, and the output unit 657 are implemented as software.

The customer information acquiring unit 651 acquires a piece of customer information on a predetermined customer. For example, when the user terminal 80 inputs a name of "company A" that is a name of the predetermined customer through the communication unit 610, the customer information acquiring unit 651 transmits the name to the customer management apparatus 10 through the communication unit 610, and acquires a record of the customer information (a record with a GUID of "00001" in the customer information) from the customer management apparatus 10 (see FIG. 3). Consequently, the customer information acquiring unit 651 acquires the customer information with a customer ID of "CUSTOMER001" (the company A), that is, the customer information on the company A that is the predetermined customer.

The group information acquiring unit 652 acquires pieces of group information. For example, the group information acquiring unit 652 transmits the customer ID of "CUS-TOMER001" contained in the record of the customer information acquired by the customer information acquiring unit 651 to the group management apparatus 20 through the communication unit 610, and acquires records of the group information (records with GUIDs of "00001 to 00003" in the group information) containing the customer ID from the group management apparatus 20 (see FIG. 3 and FIG. 5). Consequently, the group information acquiring unit 652 acquires pieces of the group information on the company A that is the predetermined customer.

The device information acquiring unit 653 acquires pieces of device information. For example, the device information acquiring unit 653 transmits the group IDs of "GROUP1", "GROUP2", and "GROUP3" contained in the records of the group information acquired by the group information acquiring unit 652 to the device management apparatus 30 through the communication unit 610, and acquires records of the device information (records with GUIDs of "00001 to 00004" in the device information) containing any of the group IDs from the device management apparatus 30 (see FIG. 5 and FIG. 7). Consequently, the device information acquiring unit 653 acquires pieces of the device information on devices installed in the environment of the company A that is the predetermined customer.

The failure information acquiring unit 654 acquires pieces of failure information. In the embodiment, the failure information acquiring unit 654 acquires pieces of failure information (hereinafter, may be referred to as "one or more pieces of first failure information") on failures that have occurred in the one or more first devices, which are devices of a predetermined model of a predetermined customer among the devices 40-1 to 40-n.

For example, the failure information acquiring unit 654 transmits, to the failure management apparatus 50 through the communication unit 610, serial numbers of "FA2233-000", "FA2233-001", and "FA2233-002" associated with the model name of "MPC 3500" that is the predetermined model (see FIG. 7) from among the serial numbers contained in the records of the device information (records with the GUIDs of "00001 to 00004" in the device information), which are about devices installed in the environment of the company A and which are acquired by the device information acquiring unit 653. Then, the failure information acquiring unit 654 acquires records of the failure information (records with GUIDs of "00001 to 00006" in the failure information) containing any of the serial numbers from the failure management apparatus 50 (see FIG. 9).

Consequently, the failure information acquiring unit 654 acquires one or more pieces of the first failure information on failures that have occurred in the one or more first devices, which have the model name of "MPC 3500" and are installed in the environment of the company A. Incidentally, the model name of "MPC 3500" as the predetermined model may be specified by, for example, an input from the user terminal 80 through the communication unit 610.

Further, in the embodiment, the failure information acquiring unit 654 acquires pieces of failure information (hereinafter, may be referred to as "one or more pieces of second failure information") on failures that have occurred in one or more second devices, which are devices of the predetermined model among the devices 40-1 to 40-n.

For example, the failure information acquiring unit 654 transmits the model name of "MPC 3500" that is the predetermined model (see FIG. 7) to the failure management apparatus 50 through the communication unit 610, and acquires records of the failure information (records with GUIDs of "00001 to 00011" in the failure information) containing the model name from the failure management apparatus 50 (see FIG. 9).

Consequently, the failure information acquiring unit 654 acquires one or more pieces of the second failure information on failures that have occurred in the one or more second devices, which have the model name of "MPC 3500" and are installed in the environments of all of customers managed by the customer management apparatus 10 (in the example illustrated in FIG. 3, the company A, a company B, and a company C).

Incidentally, in the embodiment, an example will be described, in which the calculating unit 655 (to be described later) calculates pieces of operation information and failure type information on the one or more first devices per month by using one or more pieces of the first failure information, and calculates pieces of operation information and failure type information on the one or more second devices per month by using one or more pieces of the second failure information. Therefore, the failure information acquiring unit 654 acquires pieces of the failure information per month as one or more pieces of the first failure information and one or more pieces of the second failure information; however, a target period for acquisition is not limited to this example. Meanwhile, the operation information and the failure type information will be described later.

The calculating unit 655 calculates a piece of operation information on the one or more first devices (hereinafter, the piece of the operation information may be referred to as "a piece of first operation information") by using one or more pieces of the first failure information acquired by the failure information acquiring unit 654. In the embodiment, it is assumed that the piece of the first operation information is an average operation rate (hereinafter, may be referred to as a "first average operation rate") of the one or more first devices; however, it is not limited thereto.

Specifically, the calculating unit 655 calculates the first average operation rate by dividing a time, which is obtained by subtracting a total time of close times contained in the one or more pieces of the first failure information from a total operation time of the one or more first devices, by the total operation time of the one or more first devices. Alternatively, it may be possible to calculate the first average operation rate by first subtracting, from an operation time of a single first device, a time obtained by dividing the total time of the close times contained in the one or more pieces of the first failure information by the number of the first devices, and thereafter dividing the time obtained by the subtraction by the operation time of the single first device.

Further, the calculating unit 655 calculates, for each of categories of failures indicated by the failure categories, a piece of information on a failure of a corresponding category (hereinafter, this piece of information may be referred to as "a piece of first failure type information") by using the one or more pieces of the first failure information acquired by the failure information acquiring unit 654. In the embodiment, it is assumed that the piece of the first failure type information is a probability of a failure of a corresponding category (hereinafter, may be referred to as a "first probability") and an average downtime due to the failure of the corresponding category (hereinafter, may be referred to as a "first average downtime"); however, it is not limited thereto. Further, only the first probability or only the first average downtime may be used as the piece of first failure type information.

Specifically, the calculating unit 655 calculates the first probability for each of the categories of the failures indicated by the failure categories by dividing the number of pieces of the first failure information, each containing a failure of a corresponding category, by the number of the first devices for each of the categories of the failures indicated by the failure categories. Further, the calculating unit 655 calculates the first average downtime for each of the categories of the failures indicated by the failure categories by dividing a total time of close times contained in the pieces of the first failure information, each containing a failure of a corresponding category, by the number of the pieces of the first failure information, each containing the failure of the corresponding category, for each of the categories of the failures indicated by the failure categories.

In the following, calculations of the first average operation rate, the first probability, and the first average downtime will be described in detail. Herein, it is assumed that the one or more first devices are three devices with the serial numbers of "FA2233-000", "FA2233-001", and "FA2233-002" (see FIG. 7), and the one or more pieces of the first failure information are records with the GUIDs of "00001 to 00006" in the failure information (see FIG. 9). Furthermore, it is assumed that the first average operation rate, the first probability, and the first average downtime are values per month as described above; however, it is not limited thereto.

First, a calculation of the first average operation rate will be described. It is assumed that a scheduled monthly operation time of a single device is 160 hours (8 hours×20 days). In this example, a total operation time of the one or more first devices is 480 hours (3 devices×160 hours), and a total time of close times contained in the one or more pieces of the first failure information is 39 hours (4 hours+5 hours+17 hours+4 hours+2 hours+7 hours) (see FIG. 9). Therefore, the first average operation rate is 91.9% (100%×(480 hours−39 hours)/480 hours).

Next, a calculation of the first probability will be described. In this example, categories of failures indicated by the failure categories are three types of categories of "paper jam", "no toner", and "network error". The number of records of the first failure information containing "paper jam" is three, the number of records of the first failure information containing "no toner" is two, and the number of records of the first failure information containing "network error" is one (see FIG. 9). Therefore, the first probability of "paper jam" is 100% (100%×3 records/3 devices), the first probability of "no toner" is 67% (100%×2 records/3 devices), and the first probability of "network error" is 33% (100%×1 record/3 devices).

Next, a calculation of the first average downtime will be described. The categories of the failures indicated by the failure categories are three types of categories of "paper jam", "no toner", and "network error" as described above. The number of records of the first failure information containing "paper jam" is three, the number of records of the first failure information containing "no toner" is two, and the number of records of the first failure information containing "network error" is one. A total time of close times contained in the pieces of the first failure information containing "paper jam" is 10 hours (4 hours+4 hours+2 hours), a total time of close times contained in the pieces of the first failure information containing "no toner" is 12 hours (5 hours+7 hours), and a total time of a close time contained in the piece of the first failure information containing "network error" is 17 hours (see FIG. 9). Therefore, the first average downtime of "paper jam" is 3.33 hours (10 hours/3 records), the first average downtime of "no toner" is 6 hours (12 hours/2 records), and the first average downtime of "network error" is 17 hours (17 hours/1 record).

Further, the calculating unit 655 calculates a piece of operation information on the one or more second devices (hereinafter, the piece of the operation information may be referred to as "a piece of second operation information") by using one or more pieces of the second failure information acquired by the failure information acquiring unit 654. In the embodiment, it is assumed that the piece of the second operation information is an average operation rate (hereinafter, may be referred to as a "second average operation rate") of the one or more second devices; however, it is not limited thereto.

Specifically, the calculating unit 655 calculates the second average operation rate by dividing a time, which is obtained by subtracting a total time of close times contained in the one or more pieces of the second failure information from a total operation time of the one or more second devices, by the total operation time of the one or more second devices. Alternatively, it may be possible to calculate the second average operation rate by first subtracting, from an operation time of a single second device, a time obtained by dividing the total time of the close times contained in the one or more pieces of the second failure information by the number of the second devices, and thereafter dividing the time obtained by the subtraction by the operation time of the single second device.

Further, the calculating unit 655 calculates, for each of the categories of the failures indicated by the failure categories, a piece of information on a failure of a corresponding category (hereinafter, this piece of information may be referred to as "a piece of second failure type information") by using one or more pieces of the second failure information acquired by the failure information acquiring unit 654. In the embodiment, it is assumed that the piece of the second failure type information is a probability of a failure of a corresponding category (hereinafter, may be referred to as a "second probability") and an average downtime due to the failure of the corresponding category (hereinafter, may be referred to as a "second average downtime"); however, it is not limited thereto. Further, only the second probability or only the second average downtime may be used as the piece of the second failure type information.

Specifically, the calculating unit 655 calculates the second probability for each of the categories of the failures indicated by the failure categories by dividing the number of pieces of the second failure information, each containing a failure of a corresponding category, by the number of the second devices for each of the categories of the failures indicated by the failure categories. Further, the calculating unit 655 calculates the second average downtime for each of the categories of the failures indicated by the failure categories by dividing a total time of close times contained in the pieces of the second failure information, each containing a failure of a corresponding category, by the number of the pieces of the second failure information, each containing the failure of the corresponding category, for each of the categories of the failures indicated by the failure categories.

In the following, calculations of the second average operation rate, the second probability, and the second average downtime will be described in detail. Herein, it is assumed that one or more pieces of the second failure information are records with GUIDs of "00001 to 00011" in the failure information, and the one or more second devices are six devices with serial numbers of "FA2233-000", "FA2233-001", "FA2233-002", "FA2233-010", "FA2233-011", and "FA2233-012" (see FIG. 9). Furthermore, it is assumed that the second average operation rate, the second probability, and the second average downtime are values per month as described above; however, it is not limited thereto.

First, a calculation of the second average operation rate will be described. It is assumed that a scheduled monthly operation time of a single device is 160 hours (8 hours×20 days) as described above. In this example, a total operation time of the one or more second devices is 960 hours (6 device×160 hours), and a total time of close times contained in the one or more pieces of the second failure information is 73 hours (4 hours+5 hours+17 hours+4 hours+2 hours+7 hours+2 hours+4 hours+5 hours+10 hours+13 hours) (see FIG. 9). Therefore, the second average operation rate is 92.4% (100%×(960 hours−73 hours)/960 hours).

Next, a calculation of the second probability will be described. In this example, categories of failures indicated by the failure categories are three types of categories of "paper jam", "no toner", and "network error". However, "unknown" is excluded from targets (see FIG. 9). The number of records of the second failure information containing "paper jam" is five, the number of records of the second failure information containing "no toner" is three, and the number of records of the second failure information containing "network error" is two (see FIG. 9). Therefore, the second probability of "paper jam" is 83% (100% ×5 records/6 devices), the second probability of "no toner" is 50% (100% ×3 records/6 devices), and the second probability of "network error" is 33% (100% ×2 records/6 devices).

Next, a calculation of the second average downtime will be described. The categories of the failures indicated by the failure categories are three types of categories of "paper jam", "no toner", and "network error" as described above. The number of records of the second failure information containing "paper jam" is five, the number of records of the second failure information containing "no toner" is three, and the number of records of the second failure information containing "network error" is two. A total time of close times contained in the pieces of the second failure information containing "paper jam" is 19 hours (4 hours+4 hours+2 hours+4 hours+5 hours), a total time of close times contained in the pieces of the second failure information containing "no toner" is 22 hours (5 hours+7 hours+10 hours), and a total time of close times contained in the pieces of the second failure information containing "network error" is 30 hours (17 hours+13 hours) (see FIG. 9). Therefore, the second average downtime of "paper jam" is 3.8 hours (19 hours/5 records), the second average downtime of "no toner" is 7.33 hours (22 hours/3 records), and the second average downtime of "network error" is 15 hours (30 hours/2 records).

The comparing unit 656 compares the first average operation rate and the second average operation rate calculated by the calculating unit 655. If the first average operation rate is lower than the second average operation rate, the comparing unit 656 compares the first probability and the second probability calculated by the calculating unit 655 and compares the first average downtime and the second average downtime calculated by the calculating unit 655, for each of the categories of the failures indicated by the failure categories. However, the comparing unit 656 may compare only the first probability and the second probability or compare only the first average downtime and the second average downtime.

For example, if the first average operation rate is 91.9% and the second average operation rate is 92.4% as described above, because the first average operation rate is lower than the second average operation rate, the comparing unit 656 compares the first probability and the second probability calculated by the calculating unit 655 and compares the first average downtime and the second average downtime calculated by the calculating unit 655, for each of the categories of the failures indicated by the failure categories.

Herein, it is assumed that, as described above, the first probability of "paper jam" is 100%, the second probability of "paper jam" is 83%, the first probability of "no toner" is 67%, the second probability of "no toner" is 50%, the first probability of "network error" is 33%, the second probability of "network error" is 33%, the first average downtime of "paper jam" is 3.33 hours, the second average downtime of "paper jam" is 3.8 hours, the first average downtime of "no toner" is 6 hours, the second average downtime of "no toner" is 7.33 hours, the first average downtime of "network error" is 17 hours, and the second average downtime of "network error" is 15 hours.

In this case, the comparing unit 656 determines that the first probabilities of "paper jam" and "no toner" are higher than the second probabilities of "paper jam" and "no toner", and the first average downtime of "network error" is longer than the second average downtime of "network error".

The output unit 657 outputs a piece of proposal information indicating a proposal based on the piece of the first operation information and the piece of the second operation information calculated by the calculating unit 655. Specifically, the output unit 657 outputs, to the user terminal 80 through the communication unit 610, a piece of the proposal information indicating a proposal based on the piece of the first operation information, the piece of the second operation information, the pieces of the first failure type information, and the pieces of the second failure type information calculated by the calculating unit 655.

In the embodiment, when the first average operation rate is lower than the second average operation rate, the output unit 657 outputs, as a piece of the proposal information, information for proposing at least one of maintenance and replacement of a device, in which a failure of a certain type that causes the first probability to be higher than the second probability has occurred, among the one or more first devices, or information for proposing at least one of maintenance and replacement of a device, in which a failure of a certain type that causes the first average downtime to be longer than the second average downtime has occurred, among the one or more first devices.

Alternatively, the output unit 657 may output, as the proposal information, information for proposing only maintenance of a device in which a failure of a certain type that causes the first probability to be higher than the second probability has occurred among the one or more first devices, information for proposing only replacement of a device in which a failure of a certain type that causes the first probability to be higher than the second probability has occurred among the one or more first devices, information for proposing only maintenance of a device in which a failure of a certain type that causes the first average downtime to be longer than the second average downtime has occurred among the one or more first devices, or information for proposing only replacement of a device in which a failure of a certain type that causes the first average downtime to be longer than the second average downtime has occurred among the one or more first devices.

For example, it is assumed that the comparing unit 656 determines that the first probabilities of "paper jam" and "no toner" are higher than the second probabilities of "paper jam" and "no toner", and the first average downtime of "network error" is longer than the second average downtime of "network error" as described above. "Paper jam" has occurred in each of the devices with the serial numbers of "FA2233-000", "FA2233-001", and "FA2233-002", "no toner" has occurred in each of the devices with the serial numbers of "FA2233-000" and "FA2233-002", and "network error" has occurred in the device with the serial number of "FA2233-000" among the one or more first devices (see FIG. 9). Therefore, the output unit 657 outputs, as a piece of the proposal information, information for proposing at least one of maintenance and replacement of the devices with the serial numbers of "FA2233-000", "FA2233-001", and "FA2233-002".

Incidentally, when the first average operation rate is lower than the second average operation rate, the output unit 657 may output, as a piece of the proposal information, information for proposing at least one of maintenance and replacement of the one or more first devices. In this case, the output unit 657 may output, as a piece of the proposal information, only information for proposing maintenance of the one or more first devices or information for proposing only replacement of the one or more first devices.

The user terminal 80 inputs a name of a predetermined customer or a model name of a predetermined model to the information processing apparatus 60 through a browser displayed on a display device (not illustrated), and requests output of a piece of the proposal information indicating a proposal for the one or more first devices. Then, the user terminal 80 acquires a piece of the proposal information output by the information processing apparatus 60, and displays the acquired piece of the proposal information on the browser.

Figure 12:
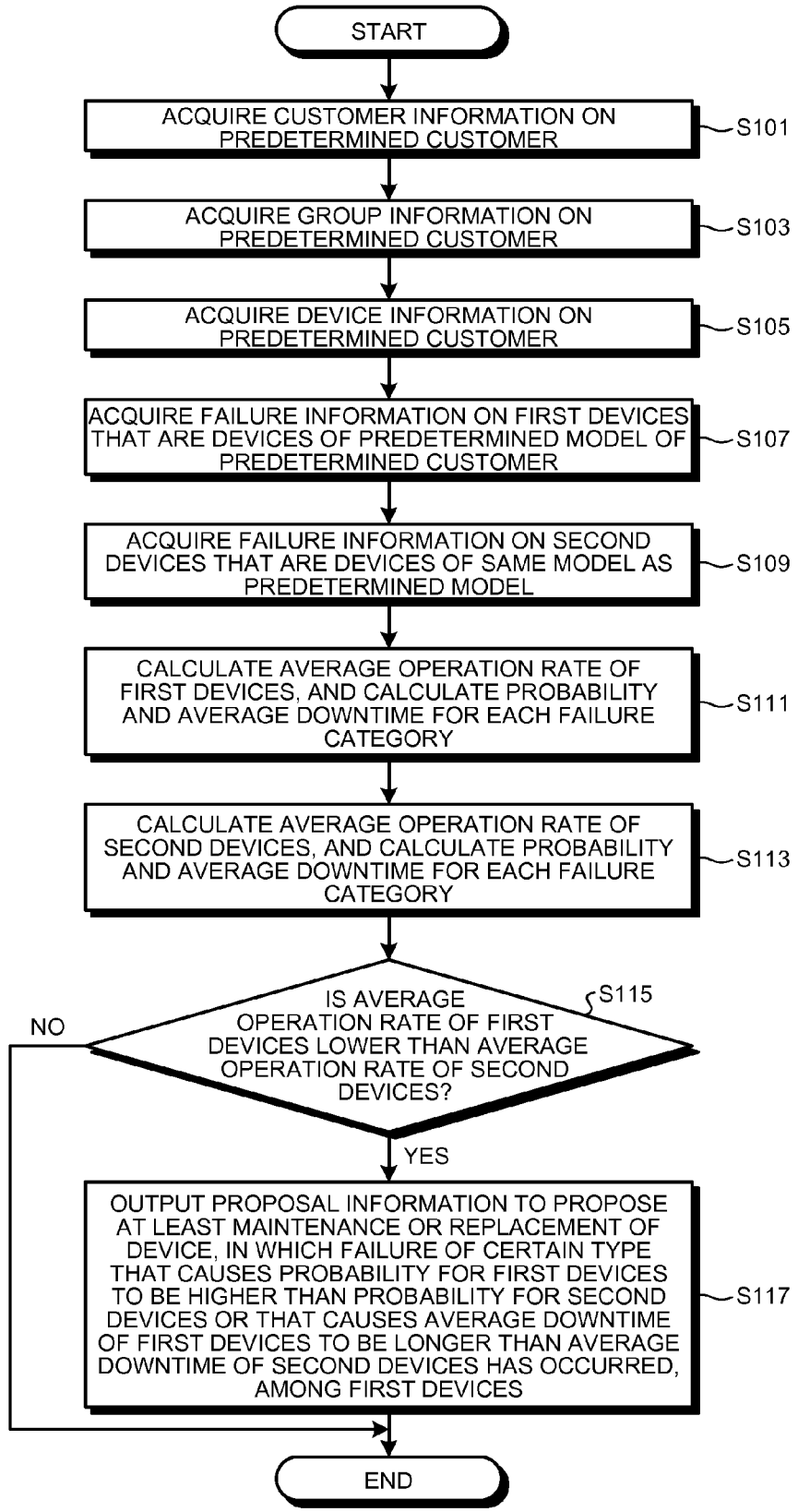
FIG. 12 is a flowchart illustrating an example of a proposal information output process performed by the information processing system of the embodiment.

FIG. 12 is a flowchart illustrating an example of a proposal information output process performed by the information processing system 1 of the embodiment.

First, the customer information acquiring unit 651 of the information processing apparatus 60, upon input of a name of a predetermined customer from the user terminal 80 via the network 2, transmits the name to the customer management apparatus 10 via the network 2, acquires a record of the customer information containing the name from the customer management apparatus 10, and acquires a piece of the customer information on the predetermined customer (Step S101).

Subsequently, the group information acquiring unit 652 of the information processing apparatus 60 transmits a customer ID contained in the record of the customer information acquired by the customer information acquiring unit 651 to the group management apparatus 20 via the network 2, acquires records of the group information each containing the customer ID from the group management apparatus 20, and acquires pieces of the group information on the predetermined customer (Step S103).

Then, the device information acquiring unit 653 of the information processing apparatus 60 transmits group IDs contained in the records of the group information acquired by the group information acquiring unit 652 to the device management apparatus 30 via the network 2, acquires records of the device information containing the group IDs from the device management apparatus 30, and acquires pieces of the device information on the predetermined customer (Step S105).

Subsequently, the failure information acquiring unit 654 of the information processing apparatus 60 transmits a serial number associated with a model name of a predetermined model among serial numbers contained in the records of the device information acquired by the device information acquiring unit 653 to the failure management apparatus 50 via the network 2, acquires records of the failure information each containing the serial number from the failure management apparatus 50, and acquires one or more pieces of failure information on the one or more first devices that are devices of the predetermined model of the predetermined customer (Step S107).

Then, the failure information acquiring unit 654 transmits the model name of the predetermined model to the failure management apparatus 50 via the network 2, acquires records of the failure information each containing the model name from the failure management apparatus 50, and acquires one or more pieces of the second failure information on the one or more second devices that are devices of the same model as the predetermined model (Step S109).

Subsequently, the calculating unit 655 of the information processing apparatus 60 calculates an average operation rate of the one or more first devices by using the one or more pieces of the failure information on the one or more first devices acquired by the failure information acquiring unit 654, and calculates a probability and an average downtime for each failure category (Step S111).

Then, the calculating unit 655 calculates an average operation rate of the one or more second devices by using the one or more pieces of the failure information on the one or more second devices acquired by the failure information acquiring unit 654, and calculates a probability and an average downtime for each failure category (Step S113).

Subsequently, the comparing unit 656 of the information processing apparatus 60 compares the average operation rate of the one or more first devices and the average operation rate of the one or more second devices calculated by the calculating unit 655, and determines whether the average operation rate of the one or more first devices is lower than the average operation rate of the one or more second devices (Step S115).

If the average operation rate of the one or more first devices is lower than the average operation rate of the one or more second devices (YES at Step S115), the output unit 657 of the information processing apparatus 60 outputs a piece of proposal information for proposing at least one of maintenance and replacement of a device, in which a failure of a certain type that causes the probability for the first devices to be higher than the probability for the second devices has occurred, among the one or more first devices, or at least one of maintenance and replacement of a device, in which a failure of a certain type that causes the average downtime of the first devices to be longer than the average downtime of the second devices has occurred, among the one or more first devices, to the user terminal 80 via the network 2 (Step S117).

In contrast, if the average operation rate of the one or more first devices is higher than the average operation rate of the one or more second devices (NO Step S115), the process ends. In this case, it may be possible to output a notice indicating that there is no proposal information to the user terminal 80 via the network 2.

As described above, in the embodiment, a proposal is given based on the operation information on a device of a predetermined model of a predetermined customer and based on the operation information on devices of the predetermined model of all of customers, by using the pieces of the failure information managed by the failure management apparatus 50. Therefore, according to the embodiment, pieces of device information accumulated every day through management of operation states of the devices can be utilized for MPS. Consequently, for example, it is possible to propose maintenance or replacement of a device of a predetermined model of a predetermined customer on the basis of a result of comparison between the operation information on the device of the predetermined model of the predetermined customer and the operation information on the devices of the predetermined model of all of the customers. As a result, it is possible to improve the operation rate of the device of the predetermined model of the predetermined customer.

In particular, in the embodiment, not only a result of comparison between the operation information on the device of the predetermined model of the predetermined customer and the operation information on the devices of the predetermined model of all of the customers, but also a result of comparison between the failure type information for each of categories of failures in the device of the predetermined model of the predetermined customer and the failure type information for each of the categories of the failures in the devices of the predetermined model of all of the customers are used. Therefore, it is possible to appropriately propose maintenance or replacement of the device of the predetermined model of the predetermined customer. Consequently, it is possible to improve the operation rate of the device of the predetermined model of the predetermined customer.

Incidentally, pieces of the device information managed by the device management apparatus 30 or pieces of the failure information managed by the failure management apparatus 50 may be structured for the information processing system 1, may be information managed by a report system that generates a service report on the operation state of a device, or may be synchronized with information managed by the report system or the like. Further, the information processing system 1 of the embodiment may be implemented as one function of the report system that generates a service report on the operation state of a device, or the like.

Modification

In the above described embodiment, an example has been described in which the information processing system 1 includes the customer management apparatus 10, the group management apparatus 20, the device management apparatus 30, the devices 40-1 to 40-n, the failure management apparatus 50, the information processing apparatus 60, and the user terminal 80; however, it is not limited thereto, and the functions of any of the devices may be substituted by other devices. For example, the information processing system 1 may be configured such that the information processing apparatus 60 further includes the functions of the customer management apparatus 10, the group management apparatus 20, the device management apparatus 30, and the failure management apparatus 50.

Further, in the above described embodiment, an example has been described in which the customer management apparatus 10 stores therein pieces of the customer information, the group management apparatus 20 stores therein pieces of the group information, the device management apparatus 30 stores therein pieces of the device information, and the failure management apparatus 50 stores therein pieces of the failure information; however, at least any of the above described information may be stored in an external apparatus or the like (for example, on cloud computing).

Hardware Configuration

Figure 13:
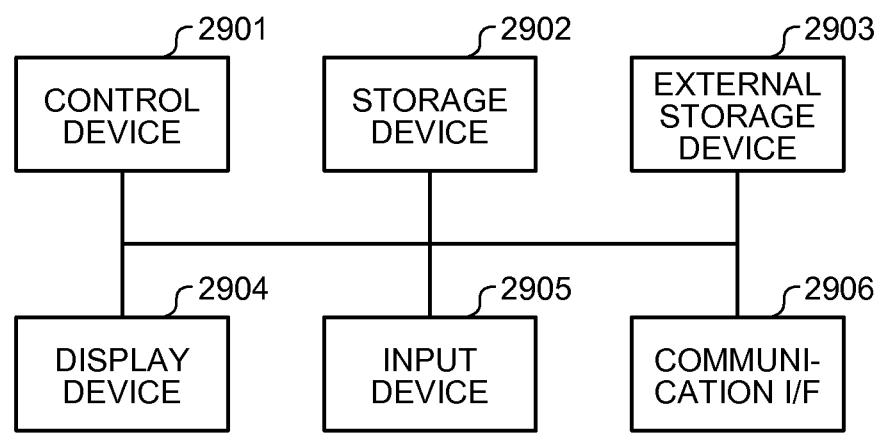
FIG. 13 is a diagram illustrating an example of a hardware configuration of each of the apparatuses of the embodiment.

FIG. 13 is a diagram illustrating an example of a hardware configuration of each of the customer management apparatus 10, the group management apparatus 20, the device management apparatus 30, the devices 40-1 to 40-n, the failure management apparatus 50, the information processing apparatus 60, and the user terminal 80 of the embodiment (hereinafter, may be referred to as each device of the embodiment). Each device of the embodiment includes a control device 2901, such as a CPU, a storage device 2902, such as a ROM or a RAM, an external storage device 2903, such as an HDD, a display device 2904, such as a display, an input device 2905, such as a keyboard or a mouse, and a communication interface (I/F) 2906, and has a hardware configuration using a normal computer.

A program executed by each device of the embodiment is provided by being stored in a computer-readable storage medium, such as a CD-ROM, CD-R, a memory card, a digital versatile disk (DVD), or a flexible disk (FD), in a computer-installable or a computer-executable file.

Further, the program executed by each device of the embodiment may be stored in a computer connected to a network, such as the Internet, and may be provided by being downloaded via the network. Furthermore, the program executed by each device of the embodiment may be provided or distributed via a network, such as the Internet. Moreover, the program executed by each device of the embodiment may be provided by being incorporated in a ROM or the like in advance.

The program executed by each device of the embodiment has a module structure to implement the above described units on a computer. As actual hardware, the CPU reads a program from the HDD onto the RAM and executes the program, so that each of the units is implemented on the computer.

According to an embodiment of the present invention, it is possible to utilize accumulated pieces of information on devices for a service.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a failure information acquiring unit configured to
acquire one or more pieces of first failure information as pieces of failure information on failures that have occurred in one or more first devices that are devices of a predetermined model of a predetermined customer from among a plurality of management target devices, and
acquire one or more pieces of second failure information as pieces of failure information on failures that have occurred in one or more second devices that are devices of the predetermined model from among the management target devices;
a calculating unit configured to
calculate a piece of first operation information as a piece of operation information on the one or more first devices by using the one or more pieces of first failure information, and
calculate a piece of second operation information as a piece of operation information on the one or more second devices by using the one or more pieces of second failure information; and
an output unit configured to output a piece of proposal information indicating a proposal based on the piece of first operation information and the piece of second operation information.

2. The information processing apparatus according to claim 1, wherein
each of the one or more pieces of first failure information contains a piece of downtime information indicating a downtime based on a failure that has occurred,
each of the one or more pieces of second failure information contains a piece of downtime information,
the piece of first operation information is a first average operation rate that is an average operation rate of the first devices, and
the piece of second operation information is a second average operation rate that is an average operation rate of the second devices.

3. The information processing apparatus according to claim 2, wherein
the calculating unit
calculates the first average operation rate by dividing a time, which is obtained by subtracting a total time of downtimes indicated by the pieces of downtime information contained in the respective one or more pieces of first failure information from a total operation time of the one or more first devices, by the total operation time of the one or more first devices, and
calculates the second average operation rate by dividing a time, which is obtained by subtracting a total time of downtimes indicated by the pieces of downtime information contained in the respective one or more pieces of second failure information from a total operation time of the one or more second devices, by the total operation time of the second devices.

4. The information processing apparatus according to claim 2, further comprising:
a comparing unit configured to compare the first average operation rate and the second average operation rate, wherein
the output unit outputs information for proposing at least one of maintenance and replacement of the first devices when the first average operation rate is lower than the second average operation rate, as the piece of the proposal information.

5. The information processing apparatus according to claim 1, wherein
each of the one or more pieces of first failure information further contains a piece of failure type identification information for identifying a type of a failure that has occurred,
each of the one or more pieces of second failure information further contains the piece of failure type identification information,
the calculating unit
calculates a piece of first failure type information as a piece of information on a failure of a certain type, for each type of failures indicated by the respective pieces of failure type identification information by using the one or more pieces of first failure information, and
calculates a piece of second failure type information as a piece of information on a failure of a certain type, for each type of failures indicated by the respective pieces of failure type identification information by using the one or more pieces of second failure information, and
the piece of proposal information is further based on the pieces of first failure type information and the pieces of second failure type information.

6. The information processing apparatus according to claim 5, wherein
each piece of first failure type information is a first probability that is a probability of a failure of a corresponding type, and each piece of second failure type information is a second probability that is a probability of a failure of a corresponding type.

7. The information processing apparatus according to claim 5, wherein
each piece of first failure type information is a first average downtime that is an average downtime of a failure of a corresponding type, and
each piece of second failure type information is a second average downtime that is an average downtime of a failure of a corresponding type.

8. The information processing apparatus according to claim 5, wherein
each piece of first failure type information is at least one of a first probability being a probability of a failure of a corresponding type and a first average downtime being an average downtime of a failure of a corresponding type, and
each piece of second failure type information is at least one of a second probability being a probability of a failure of a corresponding type and a second average downtime being an average downtime of a failure of a corresponding type.

9. The information processing apparatus according to claim 6, wherein
the calculating unit
calculates the first probability for each type of the failures indicated by the respective pieces of failure type identification information by dividing the number of pieces of first failure information, each containing a piece of failure type identification information indicating a corresponding type of failure, by the number of one or more first devices for each type of the failures indicated by the respective pieces of failure type identification information, and
calculates the second probability for each type of the failures indicated by the respective pieces of failure type identification information by dividing the number of pieces of second failure information, each containing a piece of failure type identification information indicating a corresponding type of failure, by the number of one or more second devices for each type of the failures indicated by the respective pieces of failure type identification information.

10. The information processing apparatus according to claim 7, wherein
the calculating unit calculates,
the first average downtime for each type of the failures indicated by the respective pieces of failure type identification information by dividing a total time of downtimes indicated by pieces of downtime information contained in the respective pieces of first failure information, each containing a piece of failure type identification information indicating a corresponding type of failure, by the number of pieces of first failure information, each containing the piece of failure type identification information indicating the corresponding type of failure, and
the second average downtime for each type of the failures indicated by the respective pieces of failure type identification information by dividing a total time of downtimes indicated by pieces of downtime information contained in the respective pieces of second failure information, each containing a piece of failure type identification information indicating a corresponding type of failure, by the number of pieces of second failure information, each containing the piece of failure type identification information indicating the corresponding type of failure.

11. The information processing apparatus according to claim 6, further comprising:
a comparing unit configured to compare the first average operation rate and the second average operation rate, and when the first average operation rate is lower than the second average operation rate, further compare the first probability and the second probability for each type of the failures indicated by the respective pieces of failure type identification information, wherein
the output unit outputs, as the piece of the proposal information, information for proposing maintenance or replacement of a device in which a failure of a certain type that causes the first probability to be higher than the second probability has occurred, from among the first devices.

12. The information processing apparatus according to claim 7, further comprising:
a comparing unit configured to compare the first average operation rate and the second average operation rate, and when the first average operation rate is lower than the second average operation rate, further compare the first average downtime and the second average downtime for each type of the failures indicated by the respective pieces of failure type identification information, wherein
the output unit outputs, as the piece of the proposal information, information for proposing maintenance or replacement of a device in which a failure of a certain type that causes the first average downtime to be longer than the second average downtime has occurred, from among the first devices.

13. The information processing apparatus according to claim 7, further comprising:
a comparing unit configured to compare the first average operation rate and the second average operation rate, and when the first average operation rate is lower than the second average operation rate, further perform at least one of comparison between the first probability and the second probability and comparison between the first average downtime and the second average downtime for each type of the failures indicated by the respective pieces of failure type identification information, wherein
the output unit outputs, as the piece of the proposal information, information for proposing at least one of maintenance and replacement of at least one of a device in which a failure of a certain type that causes the first probability to be higher than the second probability has occurred and a device in which a failure of a certain type that causes the first average downtime to be longer than the second average downtime has occurred, from among the first devices.

14. The information processing apparatus according to claim 1, further comprising:
a customer information acquiring unit configured to acquire a piece of customer information in which customer identification information indicates the predetermined customer;
a group information acquiring unit configured to acquire, by using the acquired piece of customer information, one or more pieces of group information which contains at least the piece of customer identification information and a piece of group identification information for identifying a group of the predetermined customer; and a device information acquiring unit configured to acquire, by using the acquired one or more pieces of group information, one or more pieces of device information containing at least a piece of device identification information for identifying a device, a piece of model identification information for identifying a model of the device, and the piece of group identification information, wherein each of the one or more pieces of first failure information further contains the piece of device identification information and the piece of model identification information, each of the one or more pieces of second failure information further contains the piece of model identification information, and the failure information acquiring unit
acquires the one or more pieces of first failure information by using one or more pieces of model identification information associated with a piece of model identification information indicating the predetermined model from among the one or more pieces of device identification information contained in the acquired pieces of device information, and
acquires the one or more pieces of second failure information by using the one or more piece of model identification information indicating the predetermined model.

15. An information processing system comprising:
a failure information storage unit configured to store a plurality of pieces of failure information on failures that have occurred in a plurality of management target devices;
a failure information acquiring unit configured to, from the failure information storage unit,
acquire one or more pieces of first failure information as pieces of failure information on failures that have occurred in one or more first devices that are devices of a predetermined model of a predetermined customer from among the management target devices, and
acquire one or more pieces of second failure information as pieces of failure information on failures that have occurred in one or more second devices that are devices of the predetermined model from among the management target devices;
a calculating unit configured to
calculate a piece of first operation information as a piece of operation information on the one or more first devices by using the one or more pieces of first failure information, and
calculate a piece of second operation information as a piece of operation information on the one or more second devices by using the one or more pieces of second failure information; and
an output unit configured to output a piece of proposal information indicating a proposal based on the piece of first operation information and the piece of second operation information.

16. An information processing method comprising:
acquiring one or more pieces of first failure information as pieces of failure information on failures that have occurred in one or more first devices that are devices of a predetermined model of a predetermined customer from among a plurality of management target devices;
acquiring one or more pieces of second failure information as pieces of failure information on failures that have occurred in one or more second devices that are devices of the predetermined model from among the management target devices;
calculating a piece of first operation information as a piece of operation information on the one or more first devices by using the one or more pieces of first failure information;
calculating a piece of second operation information as a piece of operation information on the one or more second devices by using the one or more pieces of second failure information; and
outputting a piece of proposal information indicating a proposal based on the piece of first operation information and the piece of second operation information.

* * * * *